United States Patent [19]

Sherman

[11] 4,393,039

[45] Jul. 12, 1983

[54] COOLING BY CONVERSION OF PARA TO ORTHO-HYDROGEN

[75] Inventor: Allan Sherman, Lanham, Md.

[73] Assignee: The United States of America as represented by the Administrator of the National Aeronautics and Space Administration, Washington, D.C.

[21] Appl. No.: 301,075

[22] Filed: Sep. 10, 1981

[51] Int. Cl.³ .............................................. C01B 1/00
[52] U.S. Cl. ................................. 423/648 R; 423/649
[58] Field of Search ........................... 423/649, 648 R

[56] References Cited

U.S. PATENT DOCUMENTS 2,943,917  7/1960  Weitzel .............................. 423/649

OTHER PUBLICATIONS

Kirk–Othmer, *Encyclopedia of Chemical Technology*, Second Edition, vol. II, Interscience Publishers (1966), pp. 338–341.

*Primary Examiner*—O. R. Vertiz
*Assistant Examiner*—Wayne A. Langel
*Attorney, Agent, or Firm*—John O. Tresanksy; John R. Manning; Robert E. Bushnell

[57] ABSTRACT

The cooling capacity of a solid hydrogen cooling system is significantly increased by exposing vapor created during evaporation of a solid hydrogen mass to a catalyst and thereby accelerating the endothermic para-to-ortho transition of the vapor to equilibrium hydrogen. Catalysts such as nickel, copper, iron or metal hydride gels of films of nickel, copper or iron or hydride gels of nickel, copper or iron in a low pressure drop catalytic reactor are suitable for accelerating the endothermic para-to-ortho conversion.

9 Claims, 7 Drawing Figures

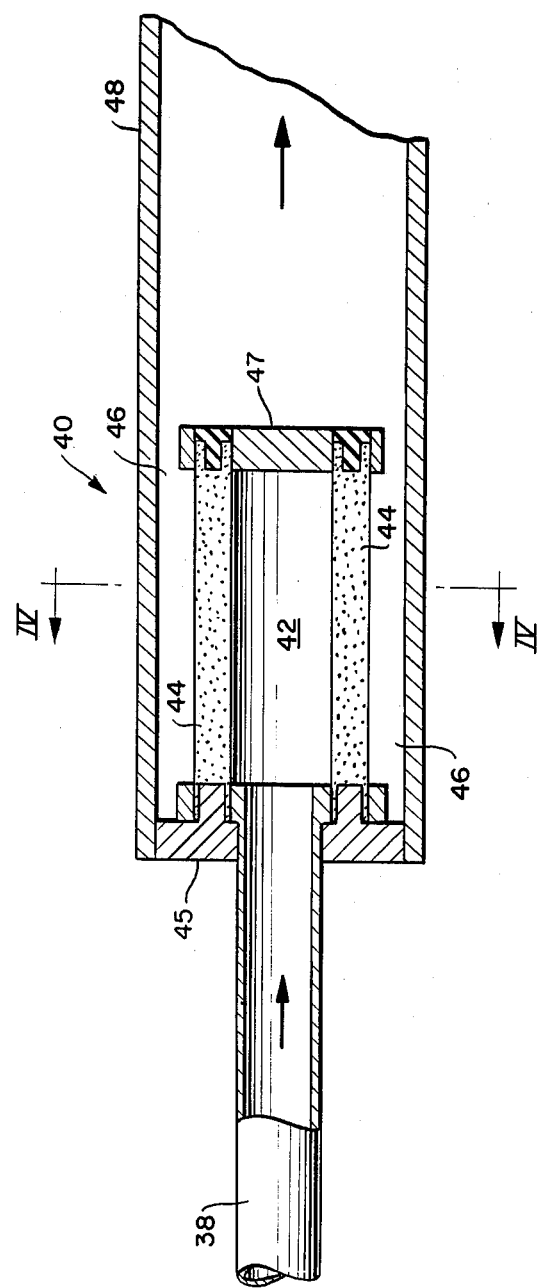
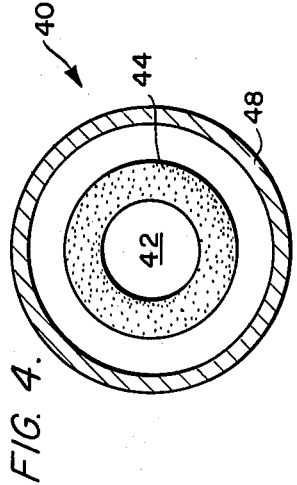

COOLING BY CONVERSION OF PARA TO ORTHO-HYDROGEN

ORIGIN OF THE INVENTION

The invention described herein was made by an employee of the U.S. Government and may be manufactured and used by or for the Government for governmental purposes without the payment of any royalties thereon or therefor.

TECHNICAL FIELD

This invention pertains to processes using a flow of gas to provide cooling and, more particularly, to the cooling of instrumentation by catalylically inducing an endothermic conversion in the state of flowing gas.

BACKGROUND ART

Solid hydrogen has a normal melting point at 14.01° K. and liquid hydrogen has a normal boiling point at 20.35° K. One of the properties of hydrogen which sets it apart from other substances is the co-existence of its two different molecular states: para-hydrogen in which the protons have opposing spins, and the more energetic ortho-hydrogen in which the protons have unidirectional spins. The A mixture of hydrogen in these two states at high temperatures is called normal hydrogen. At room temperature, normal hydrogen has a composition of approximately 25% para-hydrogen and 75% ortho-hydrogen. An equilibrium mixture of para- and ortho-hydrogen at any given temperature is called equilibrium hydrogen. At the normal boiling point of hydrogen, equilibrium hydrogen has a composition of about 99.79% para-hydrogen and 0.21% ortho-hydrogen, practically all para-hydrogen. Conversion of a hydrogen mixture from a high para-hydrogen composition to equilibrium hydrogen at any temperature is an endothermic reaction. Conversion is also extremely slow, consuming hundreds of hours. Consequently, vapor created during evaporation of a mass of solid equilibrium hydrogen retains its almost entirely para-hydrogen composition long after the vapor has reached room temperature.

Sublimation of solid hydrogen may be used as a source of cooling. Additional cooling may be obtained at temperatures higher than the triple point of hydrogen by warming the hydrogen vapor as heat is absorbed.

STATEMENT OF THE INVENTION

Accordingly, it is an object of this invention to provide a process for reliably cooling objects with hydrogen.

It is another object to provide a process for increasing the amount of cooling provided by equilibrium hydrogen vapor.

It is yet another object to provide a process for increasing the amount of cooling provided by evaporation of solid equilibrium hydrogen.

It is still another object to provide a more efficient process for cooling objects by evaporation of solid equilibrium hydrogen.

It is a further object to obtain additional cooling from a hydrogen vapor flow by subjecting the flow to an endo-thermic conversion of its composition.

These and other objects are achieved by a process in which a catalyst is used in a hydrogen vapor instrument cooling system to accelerate the para-to-ortho conversion of solid hydrogen vapors generated by sublimation of solid hydrogen at a low pressure. This conversion is an endothermic process. A catalytic converter located within a hydrogen vapor conduit between a solid hydrogen mass and a vacuum discharge vent accelerates the conversion in composition at a local region, thereby significantly increasing the available cooling capacity of the system at that region. The increased cooling capacity may be concentrated at the location of a single catalytic converter or distributed over several regions within a system by the use of several catalytic converters.

BRIEF DESCRIPTION OF THE DRAWINGS

A more complete appreciation of this invention and many of the attendant advantages thereof will be readily apparent as the same becomes better understood by reference to the following detailed description when considered in conjunction with the accompanying drawings in which like reference symbols indicate the same or similar components, and wherein:

FIG. 3 is a front sectional view of a radial flow catalytic reactor.

FIG. 4 is an end sectional view of the reactor shown in FIG. 3 taken along lines IV—IV.

DETAILED DESCRIPTION OF THE INVENTION

Figure 1:
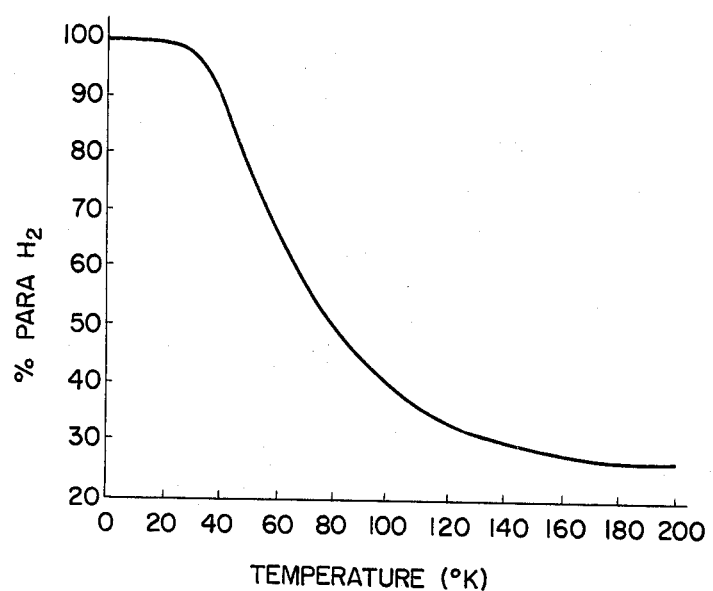
FIG. 1 is a two coordinate graph showing the percentage of para-hydrogen in equilibrium hydrogen as a function of temperature in degrees Kelvin.

Refer now to the drawings and, in particular, to FIG. 1, where a graph illustrates the equilibrium composition of para- and ortho-hydrogen as a function of temperature. The percentage of para-hydrogen in a volume of hydrogen gas decreases as the temperature of the gas is raised. After being subjected to a change in temperature, an extremely long period is required before the composition of a volume of hydrogen attains equilibrium. The spontaneous conversion of the composition of hydrogen from nearly 100% para-hydrogen to an equilibrium hydrogen composition is attributed to magnetic interactions between the ortho-hydrogen molecules. The kinetics of conversion follow a standard biomolecular rate law of:

$$-dx/dt = Kx^2 \qquad (1)$$

where x represents the concentration of one hydrogen state and K is an uncatalyzed rate constant of 0.114 per hour. The reaction time for conversion to equilibrium hydrogen may be reduced to fractions of a second, however, by exposing the hydrogen gas to a catalyst.

Figure 2:
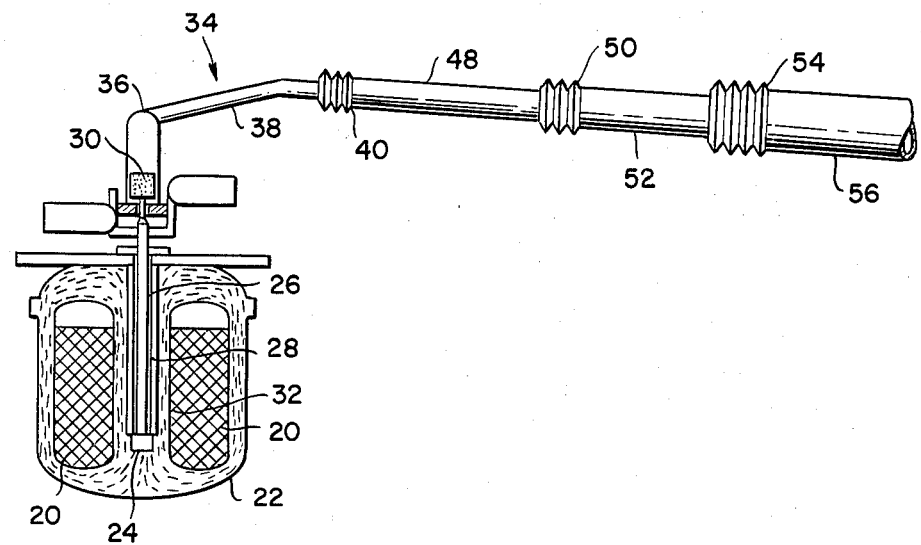
FIG. 2 is a schematic diagram of a vented hydrogen vapor cooling system adapted to the practice of the present invention.

FIG. 2 schematically illustrates the components of an exemplary process for increasing the efficiency of a vented hydrogen cooling system by subjecting the hydrogen vapor flow to an endothermic change in composition. A solid hydrogen mass 20 having an equilibrium hydrogen composition of nearly about 99.79% para-hydrogen, is held within an insulated vacuum dewar 22, at a temperature somewhat below the triple point and at a pressure of about 2 torr. An object such as a semiconductor detector module 24 is maintained at nearly the same temperature by virtue of its location intermediate to two of the segments of the solid hydrogen mass 20. A window 26 in the dewar allows the object 24 to be exposed to external sources of radiation, thereby subjecting the object to some radiant heat which is, in turn, transferred to the solid hydrogen mass 20. Parasitic heating of the solid hydrogen mass 20 occurs due to radiation and conduction losses through the insulation of dewar 22. Both types of heating cause some sublimation of solid mass 20 and the gradual release of a constant flow of very cold hydrogen vapor having the same para-hydrogen composition as solid mass 20.

A baffle 28 defines the sides of window 26 and optically couples detector module 24 with a second object 30 such as an optical lens system. A conduit 32 axially aligned with baffle 28, serves as the first section of a vent line 34 to permit hydrogen vapor to escape from dewar 22. Concomitantly, the hydrogen vapor cools the sides of bafle 28, thereby assuring that the baffle is maintained at a sufficiently low temperature to be able to absorb most radiation external to atmospheric window 26 and prevent background radiation from reaching detector module 24. The hydrogen vapor vent line 34 continues through the vacuum cover 36 surrounding object 30, a short length of conduit 38, and into a first catalytic reactor 40. During transit between the reservoir of dewar 22 and vacuum cover 36, the temperature of the hydrogen vapor may rise, depending upon its rate of flow, from its triple point temperature (about 14° K.) to about 30° K. due to heat exchanged between the vapor flow and objects 24, 30 and baffle 26. Despite the rise in temperature, the composition of the hydrogen vapor within conduit 38 has substantially the same para-hydrogen composition as the hydrogen vapor within the reservoir of dewar 22 due to the extremely long period required for conversion to equilibrium hydrogen. Vent line 34 may be fitted with subsequent sections of conduit 48, 52 and catalytic reactors 50 and 54, sequentially, before being vented via conduit 56 into a lower pressure sink 56 such as the vacuum of outer space. Alternatively, a vacuum source pump (not shown) may be connected to the end of conduit 56 to assure a continuous flow of hydrogen vapor from the reservoir of dewar 22.

The design of catalytic reactors 40, 50 and 54 may have any of several designs suitable to limiting the pressure drop in the hydrogen vapor flow.

The respective front and end sectional views of FIGS. 3 and 4 illustrate the details of one type of catalytic reactor 40. It is designed to induce hydrogen vapor entering the reactor via conduit 38 to flow into inner chamber 42, radially outward through a toroidal ctalyst bed 44 and into an outer annulus 46. The vapor then flows into a second section of conduit 48. The catalyst bed 44 should be thin and have a large cross-setional area to assure that the pressure drop in hydrogen flow is low.

Figure 5:
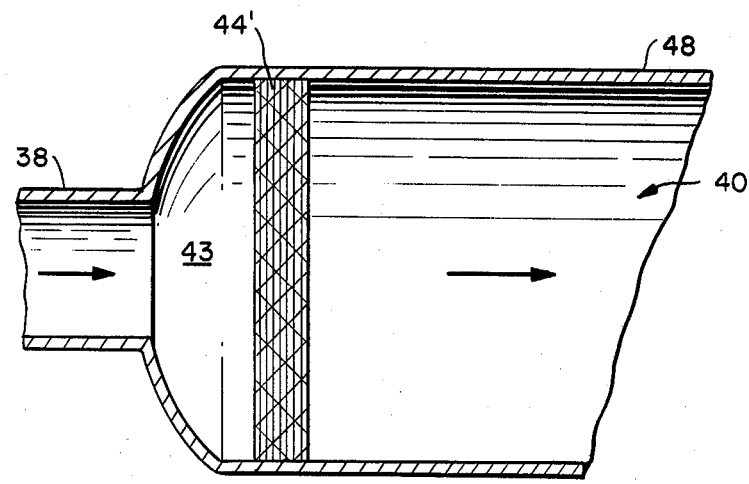
FIG. 5 is a front sectional view of a packed bed catalytic reactor.
Figure 6:
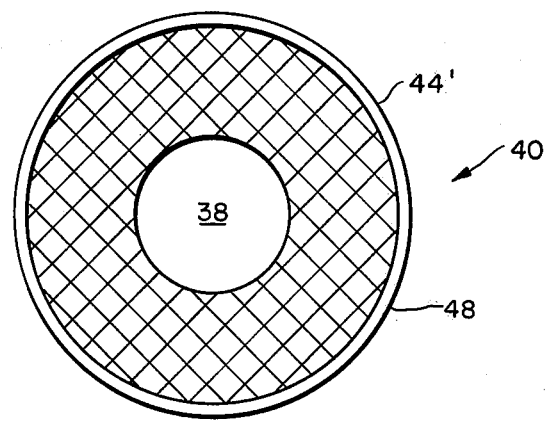
FIG. 6 is an end view of the packed bed catalytic reactor of FIG. 5.

FIGS. 5 and 6 illustrate the details of another type of catalytic reactor 40. Hydrogen vapor flowing into the reactor via conduit 38 enters an enlarged central chamber 43, flows through a packed bed catalyst 44', and into a second section of conduit 48. The packed catalyst bed should be thin and have a large cross-sectional area, much like a pancake, to assure that the pressure drop in hydrogen flow is low.

In both the radial flow and packed bed catalytic reactor designs, the hydrogen vapor pressure drop is a function of particle mesh size, reactor length, and radial size. Preferably, the reactor causes no more than about a 0.25 torr drop in the pressure of the hydrogen vapor.

Figure 7:
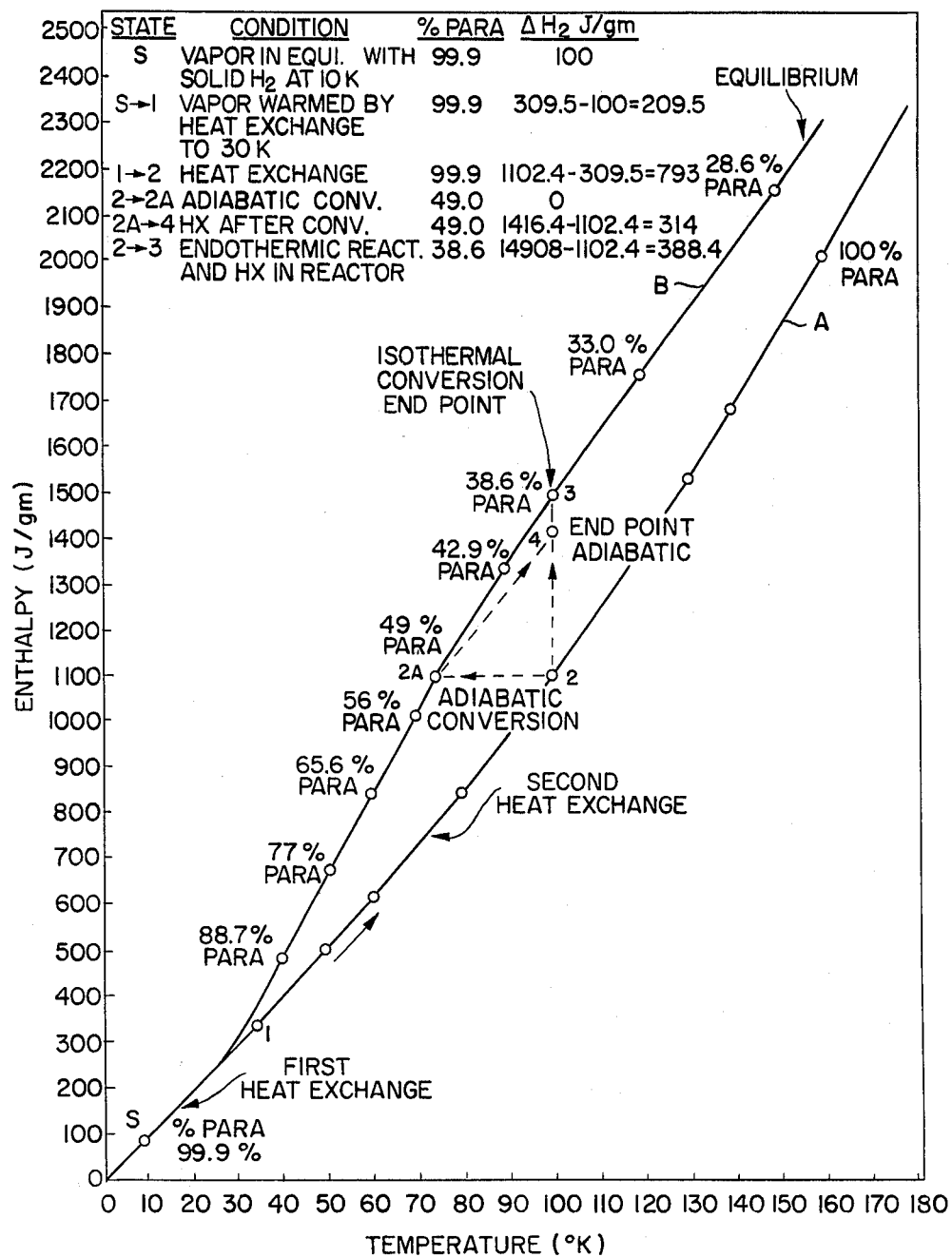
FIG. 7 is a two coordinate graph showing the enthalpy-temperature slots for pure para-hydrogen and equilibrium hydrogen.

FIG. 7 graphically illustrates the overall thermodynamics of a para- to ortho-hydrogen vapor catalytic process applied to a hydrogen vapor cooling system. Curve A shows the enthalpy as a function of temperature of a 100% para-hydrogen composition and curve B shows the same for an equilibrium hydrogen composition. Three operating process alternatives of interest may be qualitatively compared: an adiabatic catalytic converter, an isothermal catalytic converter, and no catalytic converter.

In an adiabatic catalytic reactor, that is, where the reactor is thermally shielded from any heat source, the reactor catalyst causes the vapor to quickly reach 100% of its equilibrium composition along a line of constant enthalpy. Since the para to ortho conversion is an endothermic process, energy is removed from the vapor causing its temperature to drop at point 2A to 79° K. The equilibrium composition at point 2A is 49% para-hydrogen. The vapor may be warmed by a subsequent heat source along a line of constant composition (491% para-hydrogen) to a final temperature of 100° K. at point 4 because of the very slow reaction rates in the vent line, a process which contributes an additional 314 joules per gram cooling capacity over the uncatalyzed case of curve A (e.g., 1107 J/g versus 793 J/g, respectively). Ten watts of cooling may therefore be obtained by the adiabatic reactor with a hydrogen mass flow rate of 0.00903 grams per second.

An isothermal catalytic reactor may use heat from a subsequent heat source to maintain a constant gas temperature during a continuous conversion of the equilibrium composition of 38.6% para-hydrogen at 100° K. at point 3. There is no further heat exchange in the exit line. The enthalpy difference between points 2 and 3 is 388.4 Joules per gram, yielding a total cooling of 1181.4 Joules per gram which is the greatest cooling capacity of the three options. For comparison, the adiabiatic reactor is only 93.7% as effective, and the non-reactor option has 67.1% of the cooling capacity.

At point S on curves A and B, the hydrogen vapor is in equilibrium with solid hydrogen mass at 10° K. and has a 99.9% para-hydrogen composition. Its increase in enthalpy is 100 joules per gram. Between points S and 1, on curve A, the vapor is warmed by heat transferred from a first object such as detector module 24 to 30° K. Its composition is 99.9 para-hydrogen and its change in enthalpy is 209.5 joules per gram. Between points 1 and 2 on curve A, the vapor is warmed further by heat transferred from a second heat source such as optics assembly 30. At point 2 its composition is 99.9% para-hydrogen; its increase in enthalpy between points 1 and 2 is 793 joules per gram. Ideally, the pressure within the reservoir of dewar 22 is between 1.0 to 2 torrs, although a pressure range of 1.0 to 5 torrs is acceptable. The cooling system will operate as described, however, at dewar pressures between 0.1 to 25 torrs.

Silicate films of iron, copper, or nickel or metal hydride gels of iron, nickel or copper may be used as catalysts in the reactors to accelerate a para to ortho conversion of the hydrogen vapor composition.

I claim:

1. A hydrogen vapor cooling process, comprising the steps of:

generating a vapor having a high para-hydrogen composition;

transferring heat from a heat source to said vapor to cool said heat source; accelerating the conversion of said vapor from a high para-hydrogen composition to a mixture of para-hydrogen and ortho-hydrogen by passing said vapor through a layer of a catalyst selected from the group consisting of metal hydride gels of iron, nickel or copper;

transferring heat from a second heat source to said vapor to cool said heat source.

2. The process of claim 1 wherein said high para-hydrogen composition is generated by sublimation of a mass of solid equilibrium hydrogen.

3. The process of claim 2 wherein said mass of solid equilibrium hydrogen is at a pressure between 0.1 and 25 torrs.

4. The process of claim 3 wherein said conversion is adiabatic.

5. The process of claim 3 wherein said conversion is isothermal.

6. The process of claim 2 wherein said mass of solid equilibrium hydrogen is at a pressure between 1.0 to 5 torrs.

7. A hydrogen vapor cooling process, comprising the steps of:

generating a vapor having a high para-hydrogen composition by sublimation of solid equilibrium hydrogen at a pressure less than 25 torrs;

directing said vapor to flow past a source of heat whereby sufficient heat is transferred from said source to raise the temperature of said vapor and thereby convert said vapor into a non-equilibrium mixture of para- and ortho-hydrogen having a para-hydrogen composition in excess of equilibrium hydrogen at the same temperature;

passing said vapor through a catalyst to accelerate endothermic conversion of said non-equilibrium mixture of para- and ortho-hydrogen to equilibrium hydrogen;

directing said vapor to flow past a source of heat whereby additional heat is transferred to said vapor.

8. The process defined by claim 7 further comprising the step of shielding said catalyst from external sources of heat while said vapor is passing through said catalyst.

9. The process of claim 7 wherein said additional heat is transferred to said vapor while said vapor is passing through said catalyst.

* * * * *